UNITED STATES PATENT OFFICE.

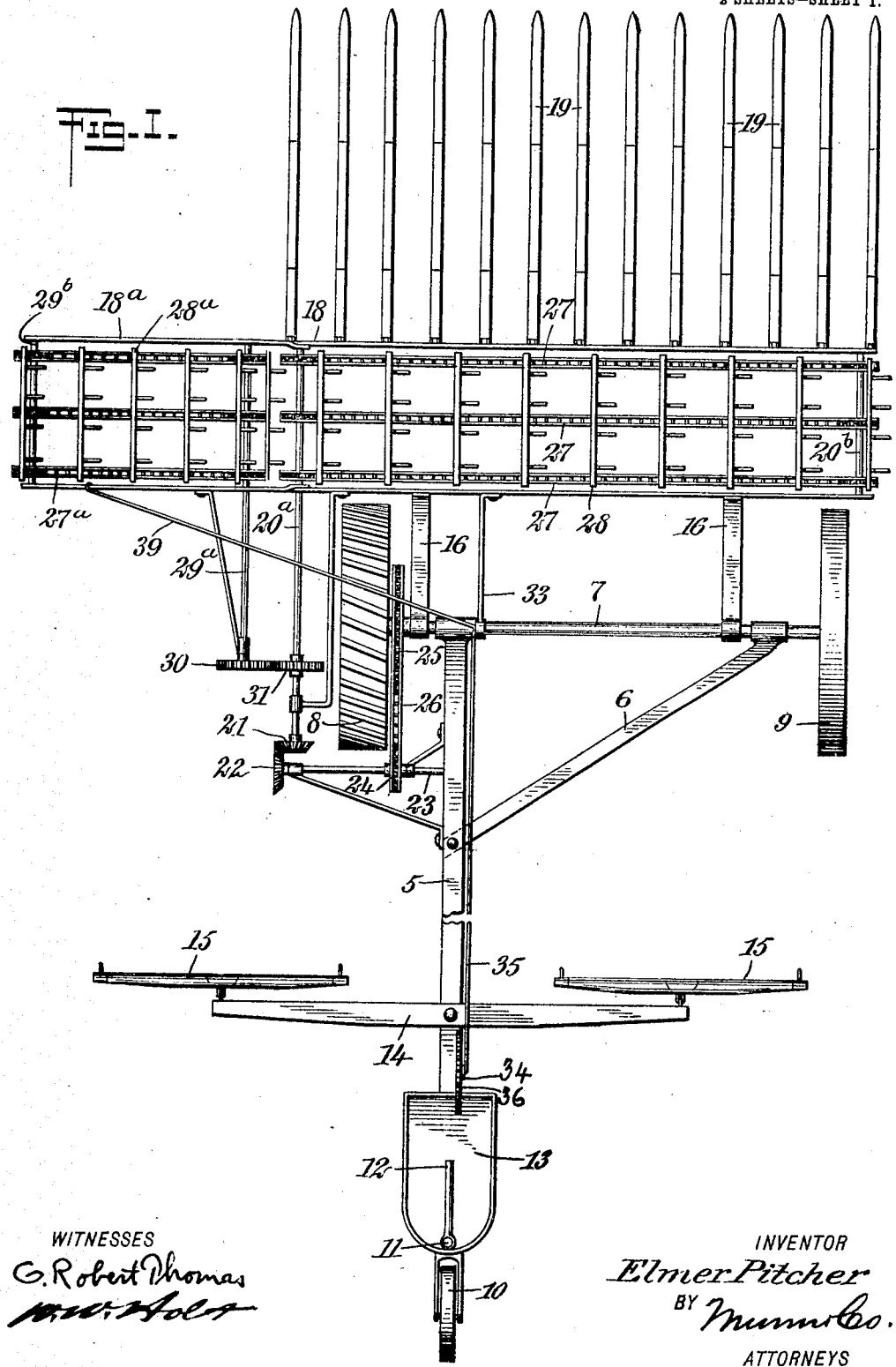

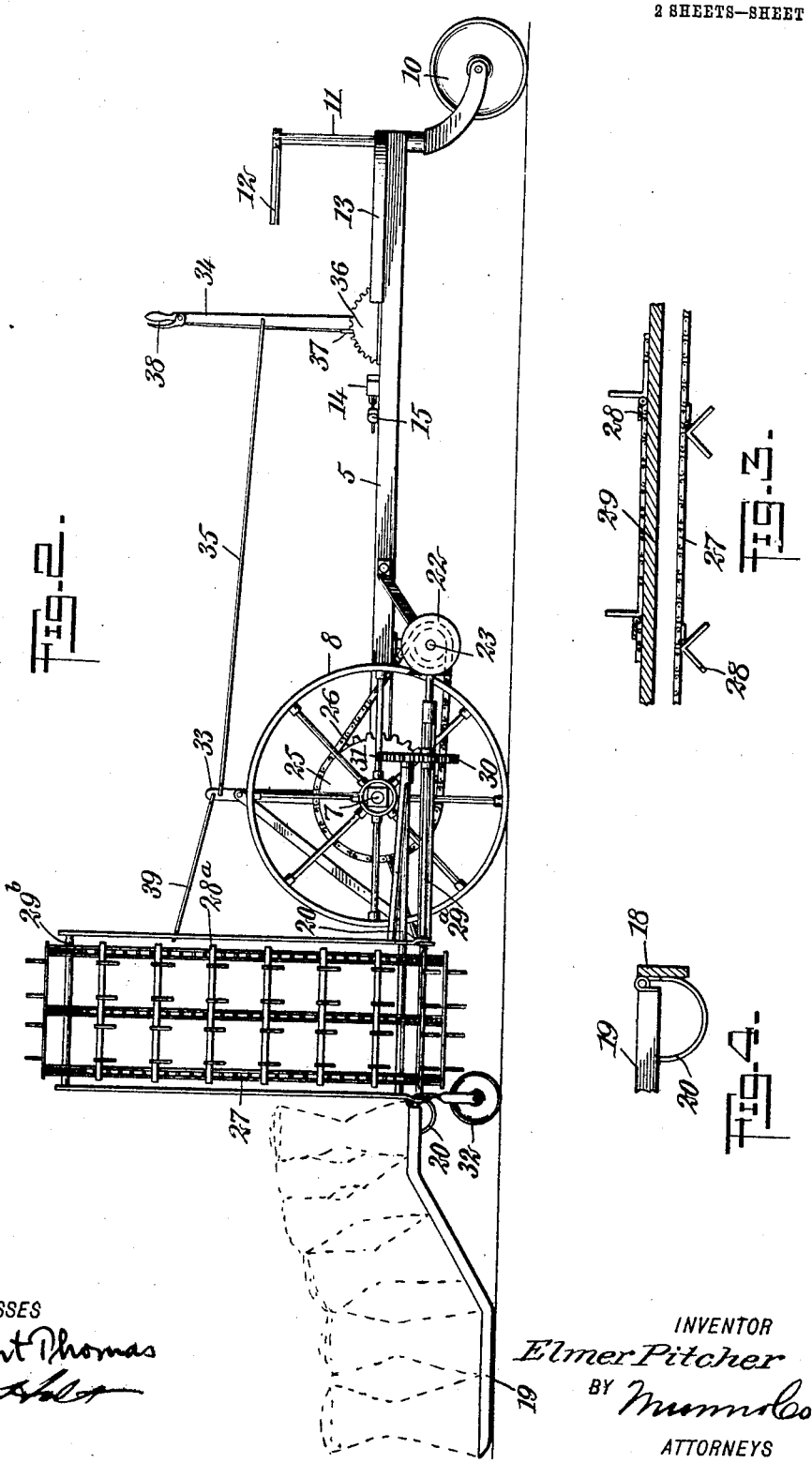

ELMER PITCHER, OF VERONA, NORTH DAKOTA.

SHOCK-LOADER.

No. 913,428.  Specification of Letters Patent.  Patented Feb. 23, 1909.

Application filed January 14, 1908. Serial No. 410,722.

*To all whom it may concern:*

Be it known that I, ELMER PITCHER, a citizen of the United States, and a resident of Verona, in the county of Lamoure and State of North Dakota, have invented a new and Improved Shock-Loader, of which the following is a full, clear, and exact description.

This invention is an improvement in shock loaders designed to continuously pick up grain shocks and discharge them on a delivery mechanism while still in an upright position, and by said delivery mechanism convey them to a wagon. In this manner of gathering up the shocks the same are not roughly shaken, and a considerable quantity of the grain is thereby saved from waste.

The invention further resides in certain special features of construction and combination of parts as will be hereinafter described and pointed out in the claims annexed.

Reference is to be had to the accompanying drawings forming a part of this specification, in which similar characters of reference indicate corresponding parts in all the views.

Figure 1 is a plan of the machine complete; Fig. 2 is a side elevation of the same; Fig. 3 is a fragmentary longitudinal section through the conveyer; and Fig. 4 is a detail showing the connection of the forked teeth at the side of the conveyer.

The machine embodies in its preferred construction a supporting or principal frame comprising the longitudinal bar 5, and the brace 6 rigidly secured thereto, both the bar and brace at the forward end of the frame being connected to an axle 7, having a driving or bull-wheel 8 at or near one end, and a wheel 9 at the opposite end. The rear end of the supporting frame has a steering wheel 10 journaled within a fork 11, the stem of the latter passing through, and some distance above, the bar 5, where it is provided with an operating handle 12. The bar 5 also carries a platform 13, on which the operator may stand in working the handle 12, and a cross-tree 14, having the swingle trees 15, for hitching the draft animals. A second frame has a pivotal movement relatively to the main frame through the axle 7, and consists of two arms 16, carried near each end of the axle and rigidly attached at their forward ends to a conveyer frame 18. The opposite and forward side of this last mentioned frame carries a series of fork teeth 19, having their forward ends offset, as shown in Fig. 2, to carry them substantially parallel to the ground. In order that these teeth may have a pivotal movement relatively to the pivoted frame to compensate for the undulations in the ground over which the machine travels, the said teeth are hinged to the conveyer frame as shown in Fig. 4, and are limited in their downward movement by curved springs 20, these springs being rigidly attached to the teeth and bearing directly on the frame 18. At the opposite ends of the conveyer frame are journaled shafts $20^a$ and $20^b$ the shaft $20^a$, which is adjacent to the driving-wheel 8, being extended to the rear of said wheel where it is provided with a bevel pinion 21, meshing with a similar pinion 22, carried by a shaft 23, which is journaled in suitable bearings and arranged transversely of the machine. This last-named shaft also carries a sprocket wheel 24 which is driven from a sprocket wheel 25 in fixed relation to the wheel 8, by a chain 26.

The shafts $20^a$ and $20^b$, between the side frames of the conveyer, are provided with a suitable number of sprocket wheels, three being shown, over which pass chains 27, the latter being connected together at intervals by cross-slats 28, and traveling over a base-board 29, best shown in detail in Fig. 3, and suitably supported on the forward pivoted frame.

At that side of the machine to which the conveyer discharges, it is extended by an elevator, the side frames $18^a$ of which are journaled or pivoted on the shaft $20^a$, and is provided adjacent to this shaft with a parallel shaft $29^a$, which has a pinion 30 meshing with a corresponding pinion 31, in fixed relation to the shaft $20^a$. The shaft $29^a$ is provided with a number of sprocket wheels between the elevator frame, corresponding to the sprocket wheels of the conveyer, over which pass a number of chains $27^a$, and which also pass over a like number of sprocket wheels carried by a shaft $29^b$, at the opposite and upper end of the elevator frame. The chains $27^a$ of the elevator frame are connected together by cross-slats $28^a$, arranged at intervals, as in the case of the conveyer. These slats, as best shown in Fig. 3, in the case of both the conveyer and elevator, carry L-shaped members or teeth hinged thereto which operate to automatically drop to an upright and operative position under the action of gravity on their forward travel, but swing freely on their return travel.

The forward pivotal frame, carrying the forked teeth, conveyer and elevator, when in normal operative position, is additionally supported by a wheel 32, preferably arranged at the forward side of the conveyer. For swinging this frame on the axle, and moving the forked teeth a substantial distance above the surface of the ground in taking the machine to and from the field, I connect the inner side of the conveyer frame to one arm of a bell-crank lever 33, and journal the said lever on the axle 7. To the vertical arm of this lever I connect a controlling lever 34 by means of a link 35, the said controlling lever being arranged adjacent to the platform 13 so that the operator while steering the machine may lift or lower the front pivotal frame without shifting his position. The lever 34 traverses the usual segmental gear 36, the teeth of which are engaged by a catch 37, operated by the finger-piece 38. The elevator is secured in the desired angular position by a link 39, which is attached to the upright arm of the bell-crank lever 33, and has a suitable adjustable connection with the inner side of the elevator frame.

In the operation of the machine the teeth of the fork pass under the shocks, as the machine moves forward, without moving the shocks from an upright position. The shocks are thus pushed back upon the conveyer which discharges them on the elevator, the latter delivering the shocks into a wagon or other suitable receptacle. In this manner of gathering up the shocks the same are not roughly shaken, and any considerable loss of grain from this source is avoided.

By reason of the elevator frame being pivotally connected to the shaft 20ª, the pinion 30, when the inclination of the elevator is changed, travels circumferentially around the pinion 31 and remains in mesh therewith.

The invention as shown and described while being the preferred construction and arrangement of the shock loader, may obviously be modified in numerous particulars without departing from the nature of the invention as set forth in the claims annexed.

Having thus described my invention I claim as new and desire to secure by Letters Patent:

1. The combination of a frame, an axle having wheels arranged at and supporting the forward end of the frame, a steering wheel supporting the rear end of the frame, a second frame having its rear end connected to the axle, whereby it is pivotally movable with respect to the first mentioned frame, an elevator and a conveyer carried transversely on the second frame, with the conveyer discharging on the elevator, and fork teeth pivoted on the second frame in advance of the conveyer and discharging thereon.

2. The combination of a wheeled frame having an elevator, a conveyer discharging on the elevator, and fork teeth hinged adjacent to the elevator and discharging thereon, provided with spring stops to limit their downward movement.

3. The combination of a main frame, an axle having wheels supporting the forward end thereof, a steering wheel supporting the rear end of the main frame, a second frame having a pivotal movement relatively to the main frame through said axle and arranged at the front thereof, a conveyer having an elevator at the discharge end thereof carried by the second frame and a fork arranged at the forward side of the conveyer having a pivotal movement independent of the second frame.

4. The combination of a main frame, an axle having wheels supporting the forward end of the main frame, a second frame carried on said axle, having a pivotal movement relatively to the main frame, a conveyer carried on the pivotal frame, a fork pivoted to the second frame in advance of the conveyer and discharging thereon, a bell-crank lever journaled on the axle, having one arm thereof rigidly connected with the second frame, and means carried by the main frame for operating said lever to swing the second frame to and from operative position.

5. The combination of a main frame, an axle having wheels supporting the forward end of the main frame, a frame carried on said axle having a pivotal movement relatively to the main frame, a conveyer having an elevator at the discharge end thereof carried on the pivotal frame, a fork projecting from the forward side of the conveyer and discharging thereon, a bell-crank lever journaled on said axle having one arm thereof rigidly connected with the pivoted frame, means carried by the main frame for operating said lever to swing the pivoted frame to and from operative position, and means for varying the inclination of the elevator having a connection with said lever.

6. The combination of a main frame, an axle having wheels supporting the forward end thereof, a steering wheel supporting the rear end of the main frame, having a controlling device, a second frame connected to the main frame by said axle and having a pivotal movement relatively to the main frame, a delivery mechanism carried by the second frame, a fork carried by the second frame in advance of the delivery mechanism and having a relatively vertical movement, and means for swinging the second frame to and from operative position, operable adjacent to said controlling device.

In testimony whereof I have signed my name to this specification in the presence of two subscribing witnesses.

ELMER PITCHER.

Witnesses:
C. C. LORY,
WM. BROWN.